Aug. 12, 1969  E. P. PREVIC  3,461,172
HYDROGENATION OF ORTHO-PHENOLIC MANNICH BASES
Filed Nov. 22, 1966
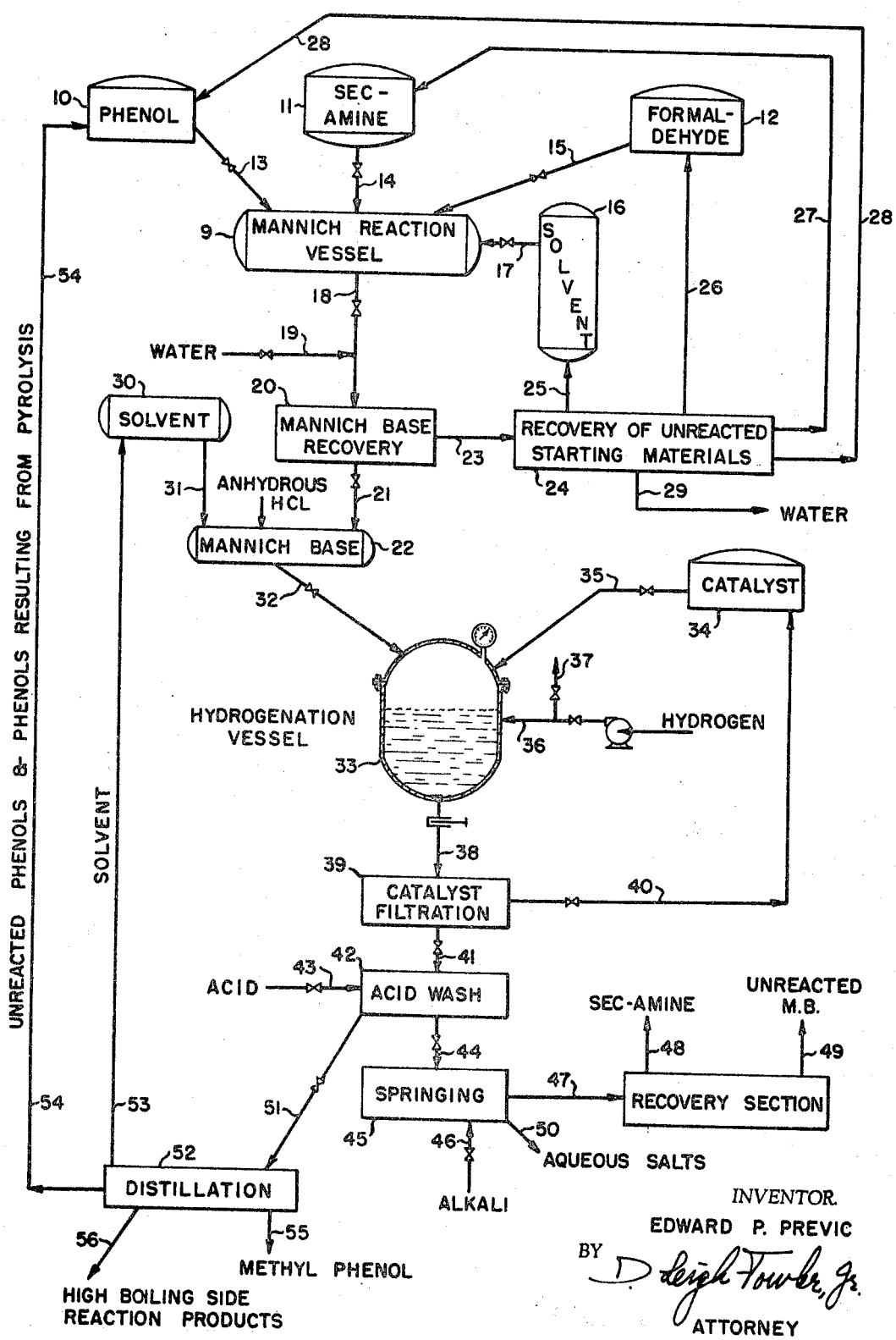
INVENTOR.
EDWARD P. PREVIC
BY D. Leigh Towler, Jr.
ATTORNEY

3,461,172
HYDROGENATION OF ORTHO-PHENOLIC MANNICH BASES

Edward P. Previc, Gainesville, Fla., assignor to Consolidation Coal Company, Pittsburgh, Pa., a corporation of Delaware
Continuation-in-part of application Ser. No. 325,243, Nov. 21, 1963. This application Nov. 22, 1966, Ser. No. 600,344
Int. Cl. C07c 37/10, 37/12
U.S. Cl. 260—621    5 Claims

ABSTRACT OF THE DISCLOSURE

The conversion of an ortho-phenolic Mannich base to an ortho-methylated phenol by hydrogenation is improved by first converting the Mannich base to its hydrochloride.

---

This application is a continuation-in-part of my copending application Ser. No. 325,243, now abandoned, filed Nov. 21, 1963, and assigned to the assignee of the present application.

The present invention relates to an improved process for hydrogenating ortho-phenolic Mannich bases. By ortho-phenolic Mannich bases are meant those phenols having at least one Mannich base group in the ortho position.

A phenolic Mannich base can be produced by reacting a phenol, formaldehyde and a strongly basic secondary amine. The preparation of phenolic Mannich bases may be illustrated by the following typical reaction employing ortho-cresol as the phenol and dimethylamine as the strongly basic secondary amine.

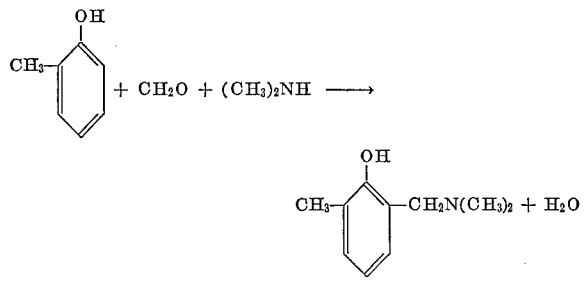

The phenolic Mannich base subsequently may be reduced with hydrogen in the presence of a catalyst at hydrogenation pressures and temperatures to restore the strongly basic secondary amine and a phenol which differs from the starting phenol by the addition of a methyl substituent at those ring positions where the Mannich reaction has occurred. Reduction of the phenolic Mannich base produced in the above illustration yields 2,6-xylenol and the starting dimethylamine.

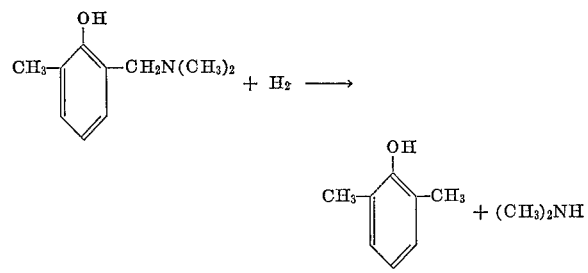

Hence the net result of the two above reactions is to produce 2,6-xylenol from ortho-cresol, or, in broader scope, to add a methyl substituent in the available ortho position of the starting phenol. The Mannich reaction will proceed at any or all available ring positions of the starting phenol which are ortho- or para- with respect to the phenolic hydroxy position. In general, the reaction favors an available ortho position unless that position is obstructed, for example, through steric hindrance.

The preparation of phenolic Mannich bases and subsequent reduction as described has been classically employed as a means for introducing a methyl substituent into a phenolic nucleus. Both reactions are well known in the art. My present invention primarily concerns the second reaction, viz., reduction of phenolic Mannich bases with hydrogen and more specifically, concerns the reduction, i.e. hydrogenation, of phenolic Mannich bases in which the Mannich base group is in a ring position which is ortho- with respect to the phenolic hydroxy position.

The yields of methylated phenols obtained by the reduction of para-phenolic Mannich bases using known catalysts, e.g., copper chromite or molybdenum sulfide, are excellent. However, I have found that the yields of such phenols resulting from the reduction of ortho-phenolic Mannich bases using the same catalysts are much lower. That is, in general, instead of yields over 90%, yields less than 70% are obtained. Accordingly, the primary object of this invention is to provide an improved process for reducing the ortho-phenolic Mannich bases to produce o-methylated phenols in yields of over 90%.

In accordance with my invention, I have found that when the ortho-phenolic Mannich base is converted before hydrogenation to its hydrochloride by reaction with anhydrous hydrogen chloride, excellent yields of the ortho-methylated phenol are obtained upon reduction of the Mannich base hydrochloride in the presence of an acid-resistant hydrogenation catalyst under otherwise conventional hydrogenation conditions.

General description of invention

The phenolic Mannich bases with which the present invention is concerned are represented by the structural formula:

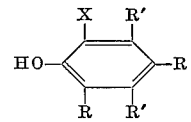

wherein each R is independently selected from the group consisting of hydrogen, a lower alkyl group of one to four carbon atoms, and X; each R' is independently selected from the group consisting of hydrogen and a lower alkyl group of one to four carbon atoms; and X is selected from the group consisting of $CH_2NR''_2$ and piperidinomethyl wherein each R'' is a lower alkyl group of one to four carbon atoms.

The preparation of the phenolic Mannich bases defined above may be conducted in the following manner. Suitable phenols would include phenol itself, cresols, xylenols, as well as any mono-substituted and di-substituted phenol. Tri-substituted and tetra-substituted phenols may be employed provided at least one ortho position contains hydrogen. An example of a tri-substituted phenol which might be used is 2,3,5-trimethylphenol; one open ortho position exists in this compound. An example of a tri-substituted phenol which is not suitable is mesitol (2,4,6-trimethylphenol) since only meta positions are open in this compound. Bicyclic, polycyclic an dihydric phenols meeting these requirements also can be employed as starting material.

The formaldehyde may be employed in any of its commercially available forms such as formalin or paraformaldehyde.

Any strongly basic secondary amine may be employed. Those which are liquid at room temperature may be employed directly, e.g. piperidine, morpholine, hexamethylenimine, pyrrolidine, and the like. Those which are vaporous at room temperature, such as dimethylamine, may be employed by providing a closed pressurized system or by dissolving them in a suitable solvent. Water is preferred solvent for dimethylamine. Secondary amines which are solid at room temperature, such as piperazine, may be employed if dissolved in a suitable solvent such as alcohol.

Dialkylamines and hetrocyclic amines which are strongly basic are suitable.

Since virtually complete recovery of the strongly basic secondary amine is comprehended in the present invention, the relatively high cost of certain amines is not a serious factor in assessing feasibility of the process.

The Mannich base may be prepared at a satisfactory rate without catalyst at room temeprature by combining in a recation vessel one mole of formaledhyde and one mole of strongly basic secondary amine for each Mannich base group which is to be substituted into the phenolic strating material. Preferably a suitable solvent such as methonal or ethanol is added to dissolve the reactants. With ortho-cresol as the starting phenolic material, for example, it is possible to place two Mannich base groups in each phenolic nucleus at the open ortho and para positions. With phenol as the starting material, for example, it is possible to place three Mannich base groups into the nucleus at the two open ortho positions and the one open para position.

The products from the Mannich reaction are recoverd as a solid or liquid phase according to the nature of the specific Mannich base. The products include unreacted starting phenol, unreacted secondary amine, unreacted formaldehyde, water formed by condensation, the solvent and the desired Mannich base.

In accordance with the present invention, the Mannich base is first converted to the corresponding hydrochloride. The conversion is accomplished by passing anhydrous hydrogen chloride into the Mannich base. Preferably a solvent is employed in which both the base and the resulting hydrochloride are soluble, thus, avoiding a filtration step. The conversion is substantially quantitative. The Mannich base hydrochloride may then be converted into a methyl homolog of the starting phenol by the Mannich base reduction process. Preferably the hydrochloride is dissolved in a solvent. The solution is introduced into a hydrogenation zone containing an acid-resistant hydrogenation catalyst. It is obviously necessary to employ hydrogenation catalysts which function in acid media. In general, these are the heavy transition metals or their oxides, for example, platinum, palladium, ruthenium, etc. Preferably, the catalysts are supported by an inert, porous, abrasion-resistant support. The solvents employed in the foregoing conversion to hydrochloride and in the ensuing hydrogenation are preferably the same. They may be any inert organic solvent, but preferably are either lower alkanols such as methanol, ethanol and isopropanol, or hydrocarbons such as benzene, toluene, heptane and hexane.

During the reduction process, the hydrogenation reaction vessel is maintained under a pressure of hydrogen gas. A hydrogenation pressure of 100 to 3000 p.s.i. is suitable. I prefer to maintain the hydrogenation pressure from about 200 to 1000 p.s.i. The hydrogenation reaction vessel is maintained at a hydrogenation temperature from about 125 to 225° C. I prefer a hydrogenation temperature of about 180–190° C. Where large amounts of catalyst are employed, lower temperatures may be used. At lower temperatures, however, the phenolic Mannich base has a tendency to undergo pyrolysis in preference to hydrogenation.

The reactants are maintained under the hydrogenation conditions in the hydrogenation reaction vessel for a sufficient period of time to effect substantially complete elimination of secondary amine from the phenolic Mannich base. Completion of reaction is indicated in a batchwise system where the hydrogen pressure ceases to decrease. The desired methylated phenol may be recovered readily by conventional separation techniques.

For a clear understanding of the present invention, its objects and advantages, reference should be had to the following detailed description and accompanying drawing which is a schematic flow sheet representation of a batchwise process for adding a methyl substituent to a phenol via the Mannich reaction employing the present invention in the reduction of the Mannich base.

Preferred embodiment

Referring to the drawing, the starting materials for the present process are confined in storage tanks 10 (phenol storage tank), 11 (strongly basic secondary amine storage tank) and 12 (formaldehyde storage tank). A phenol having at least one open ortho position is conducted from the phenol storage tank 10 through a line 13 into a Mannich reaction reaction vessel 9. If a mono-Mannich base is desired, equal molar or preferably somewhat less than equal molar quantities of secondary amine and formaldehyde are introduced into the Mannich reaction vessel 9 through lines 14 and 15 respectively. Where a bis-Mannich base or a tris-Mannich base is desired from the starting phenol, two or three molar equivalents of secondary amine and formaldehyde are employed respectively. Where the sec-amine is normally gaseous, it may be employed as a solution in a suitable solvent. With sec-amines which are normally solid, suitable solvents may be employed to effect solution. The lower aliphatic alcohols are satisfactory solvents for this purpose. Solvents may be introduced from a solvent tank 16 through a line 17 into the Mannich reaction vessel 9.

No catalyst is required to complete the Mannich reaction which proceeds smoothly at ordinary temperature, e.g. 25 to 50° C. Preferably the reactants are maintained under agitated conditions for a sufficient time, e.g. several hours, to complete the reaction. Thereafter the contents of the Mannich reaction vessel 9 may be withdrawn through a line 18 and may be mixed with water introduced through a line 19. The function of the added water is to promote a phase separation to permit convenient recovery of the aqueous-insoluble Mannich bases. The mixture of Mannich reaction products is introduced into a product recovery zone 20. Where the Mannich base is a solid material, it may be recoveerd in a highly pure condition by simple filtration. Where the Mannich base is a liquid, it forms an aqueous-insoluble phase separable by decantation. Some unreacted phenol will be present in the non-aqueous phase but does not interfere with the subsequent reduction treatment with which the present invention is primarily concerned. The Mannich base is recovered through a line 21 and is conducted to a vessel 22 for subsequent treatment as will be later described.

Unreacted starting materials are recoverd (as filtrate or as an aqueous phase) from the product recovery zone 20 through a line 23 for further treatment in a recovery zone 24. Individual constituents are thereafter recovered in any convenient manner as by distillation, extraction and the like for recycle in the process. The solvent is returned to the solvent tank 16 through a line 25. Unreacted formaldehyde is returned to the formaldehyde storage vessel 12 through a line 26. Unreacted strongly basic secondary amine is returned to the secondary amine storage vessel 11 through a line 27. Unreacted phenol in some cases is returned to the phenol storage vessel 10 through a line 28. Much af the unreacted phenol remains with the Mannich base throughout the subsequent reduction treatment. The water of condensation and added water may be rejected from the system through a line 29.

As thus far described, the process is a well-known method for preparing Mannich bases. The reduction of the Mannich base contained in the vessel 22 will now be described. A quantity of miscible solvent is withdrawn from a solvent storage vessel 30 through a line 31 and blended with the Mannich base in the vessel 22. Methanol is a suitable solvent. In some instances, the solvent may be added to the Mannich base recovery zone 20 to permit recovery of Mannich base as an extract of the solvent. Anhydrous hydrogen chloride is passed into the solution of Mannich base in vessel 22 until no more hydrogen chloride is absorbed. The conversion of the Mannich base to its corresponding hydrochloride is rapid and quantitative at room temperature.

A solution of the Mannich base in solvent is withdrawn from the storage vessel 22 through a line 32 and introduced into a hydrogenation vessel 33 adapted to confine liquid reactants at elevated temperatures and pressures. A quantity of acid-resistant hydrogenation catalyst from a storage vessel 34 is introduced into the hydrogenation vessel 33 through a line 35. The catalyst preferably is comprised of an inert, porous, abrasion-resistant support such as charcoal which has been impregnated with about 5 to 20 percent by weight of palladium. Sufficient catalyst should be used to provide about 5 to 20 parts of catalyst by weight for each 100 parts by weight of Mannich base in the hydrogenation vessel 33.

The hydrogenation vessel 33 is sealed and hydrogen is introduced through a conduit 36 to provide a hydrogenation pressure within the vessel 33. Preferably about 200 to 1000 p.s.i. will be employed. The reactants are maintained within the hydrogenation vessel 33 under conditions of intimate liquid-gas contact for sufficient time to effect regeneration of the secondary amine from the Mannich base. In a batchwise system as shown in the drawing, completion of the reaction may be detected when the hydrogen pressure ceases to decrease. In general, a residence time of about 1 to 10 hours at a hydrogenation temperature of about 125–225° C. will provide sufficient contact for completion of the reduction reaction. Thereupon excess gases are vented from the hydrogenation vessel 33 through the line 36 and a vent conduit 37. If desired, the hydrogen gas may be recovered for reuse. If the sec-amine used in the process is normally gaseous, some of it may be recovered through the vent conduit 37.

The contents of the hydrogenation vessel 33 are withdrawn through a line 38 and are subjected to a filtration treatment in a filtration zone 39 to recover catalyst particles. The recovered catalyst is recycled through a line 40 to the catalyst storage vessel 34. Since the catalyst is in the physical form of the pelleted or granular support, its recovery should be virtually complete. A liquid filtrate (i.e. the hydrogenate) is recovered from the filtration zone 39 through a line 41 and treated in an acid washing zone 42. An aqueous solution of mineral acid is introduced through a line 43 for recovering the strongly basic secondary amine as an aqueous acidic solution which is removed through a line 44. The aqueous acid extract is treated in a springing zone 45 by contact therein with an alkali solution from a line 46 which rejects the secondary amine and unreacted Mannich bases from aqueous solution. The aqueous insoluble phase is recovered following phase separation through a line 47 for separation and reuse in the process. Regenerated sec-amine is returned through a line 48 to the sec-amine storage vessel 11. Unreacted Mannich bases are returned through a line 49 for reintroduction into the process. The Mannich bases may be reintroduced into the Mannich reaction zone 9 or into the Mannich base storage vessel 22. The aqueous phase, formed in the springing zone 45, is rejected through a line 50. This aqueous phase contains ionized salts formed during the springing treatment. If desired the aqueous phase may be recycled back to the Mannich base recovery zone 20 through line 19 and may be rejected from the system through line 29.

Referring back to the acid washing zone 42, the aqueous insoluble phase produced therein is recovered through a line 51 for ultimate product recovery, for example, by conventional distillation in a distillation section 52. As readily separable distillate fractions, one may recover the solvent through a line 53 leading to the solvent storage vessel 30 and the original starting phenols (unreacted in the process or regenerated via pyrolysis reactions) through a line 54 leading to the phenol storage vessel 10. The ultimate product of the present process is recovered from the distillation section 52 through a line 55 as a methyl-substituted starting phenol. Higher boiling side reaction products are rejected as a distillation residue through a line 56.

To illustrate the present invention, a number of examples of Mannich base reduction, both in accordance with and not in accordance with this invention (for comparative purposes) will be described. The specific conditions and results are tabulated below in Table I. In each reduction, the Mannich base or its hydrochloride, as the case may be, dissolved in a suitable solvent, methanol or toluene, was charged into a 300 ml. rocking hydrogenation bomb along with a catalyst. The bomb was charged with hydrogen to the indicated pressure and heated to the indicated temperature. As reaction proceeded, the hydrogen pressure decreased indicating hydrogen absorption. When the pressure reached 200 p.s.i., additional hydrogen was charged into the bomb to restore the indicated pressure. The reduction treatment was continued in each instance until the hydrogen pressure stopped decreasing, indicating no further hydrogen absorption. The time required varied from about ten minutes to about five hours.

The parenthetical designations "aqueous HCl" or "anhydrous HCl" refer to the method by which the hydrochloride was made. Yields are reported in the following table as moles of desired product divided by moles of starting Mannich base, multiplied by 100 to express percentage.

TABLE

| Run No. | Hydro Feed | Catalyst | Temp., °C. | $H_2$ Pressure, p.s.i.g. | Conversion, Percent | Desired product mole percent yield |
|---|---|---|---|---|---|---|
| 1 | 6-dimethylaminomethyl-o-cresol | Copper chromite | 165 | 1,700–2,200 | 75 | 33% 2,6-xylenol. |
| 2 | do | Palladium on charcoal | 150 | 400–1,700 | 100 | 40% 2,6-xylenol. |
| 3 | 6-dimethylaminomethyl-o-cresol hydrochloride (anhydrous). | Copper chromite | 150 | 1,600 | 18 | Volatile conversion products =44% (wt.). |
| 4 | 6-dimethylaminomethyl-o-cresol hydrochloride (aqueous HCl). | Palladium on charcoal | 150 | 450–2,150 | 100 | 49% 2,6-xylenol. |
| 5 | 6-dimethylaminomethyl-o-cresol hydrochloride (anhydrous). | do | 147 | 1,700–2,220 | 96 | 88% 2,6-xylenol. |
| 6 | do | do | 147 | 500–790 | 100 | 96% 2,6-xylenol. |

Durenol may also be prepared in high yield, i.e. 94% in accordance with my invention starting with 6-piperidinomethyl-2,3,5-trimethylphenol hydrochloride and using palladium on charcoal as the catalyst. It is clear from the marked improvement in yields obtained by my improved method that the resistance of the ortho-phenolic Mannich bases to hydrogenolysis is a result of their particular structure which permits hydrogen bonding between the hydroxyl group and the base group. This bonding is destroyed by the conversion to the hydrochloride, thus causing the resistance to hydrogenolysis to disappear.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

I claim:
1. The method of hydrogenating a phenol represented by the structural formula:

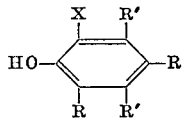

wherein each R is independently selected from the group consisting of hydrogen, a lower alkyl group of one to four carbon atoms, and X; each R' is independently selected from the group consisting of hydrogen and a lower alkyl group of one to four carbon atoms; and X is selected from the group consisting of $CH_2NR_2''$ and piperidinomethyl wherein each R" is a lower alkyl group of one to four carbon atoms, which comprises reacting anhydrous hydrogen chloride and said phenol in an inert solvent selected from the class consisting of lower alkanols and hydrocarbons to form the corresponding hydrochloride, contacting said hydrochloride with hydrogen gas in an inert solvent selected from the class consisting of lower alkanols and hydrocarbons in the presence of an acid-resistant hydrogenation catalyst consisting essentially of at least one of the heavy transition metals supported on an inert, porous support at a pressure of 100 to 3000 p.s.i. and at a temperature of about 125 to 225° C., thereafter recovering the hydrogenate free of said catalyst, and recovering sec-amine and methylated phenol from said hydrogenate.

2. The method according to claim 1 in which the heavy transition metal is selected from the group consisting of platinum, palladium and ruthenium.

3. The method according to claim 2 in which the catalyst is palladium.

4. The method according to claim 1 in which the phenol is 6-(dimethylaminomethyl)-o-cresol.

5. The method of preparing 2,6-xylenol which comprises passing anhydrous hydrogen chloride through a solution of 6-(dimethylaminomethyl)-o-cresol in methanol until no more hydrogen chloride is absorbed, thereby forming the hydrochloride of said cresol, contacting said hydrochloride in a liquid phase with hydrogen gas in the presence of a catalyst consisting essentially of charcoal impregnated with about 5 to 20 percent by weight of palladium at a pressure of about 200 to 1000 p.s.i. and at a temperature of about 125 to 225° C. for about 1 to 10 hours, and recovering 2,6-xylenol from the hydrogenate.

References Cited

UNITED STATES PATENTS 2,882,319   4/1959   Hotelling et al.

FOREIGN PATENTS 685,993   5/1964   Canada.

BERNARD HELFIN, Primary Examiner

N. MORGENSTERN, Assistant Examiner

U.S. Cl. X.R.

260—247, 293, 326, 563, 570, 583, 624